UNITED STATES PATENT OFFICE.

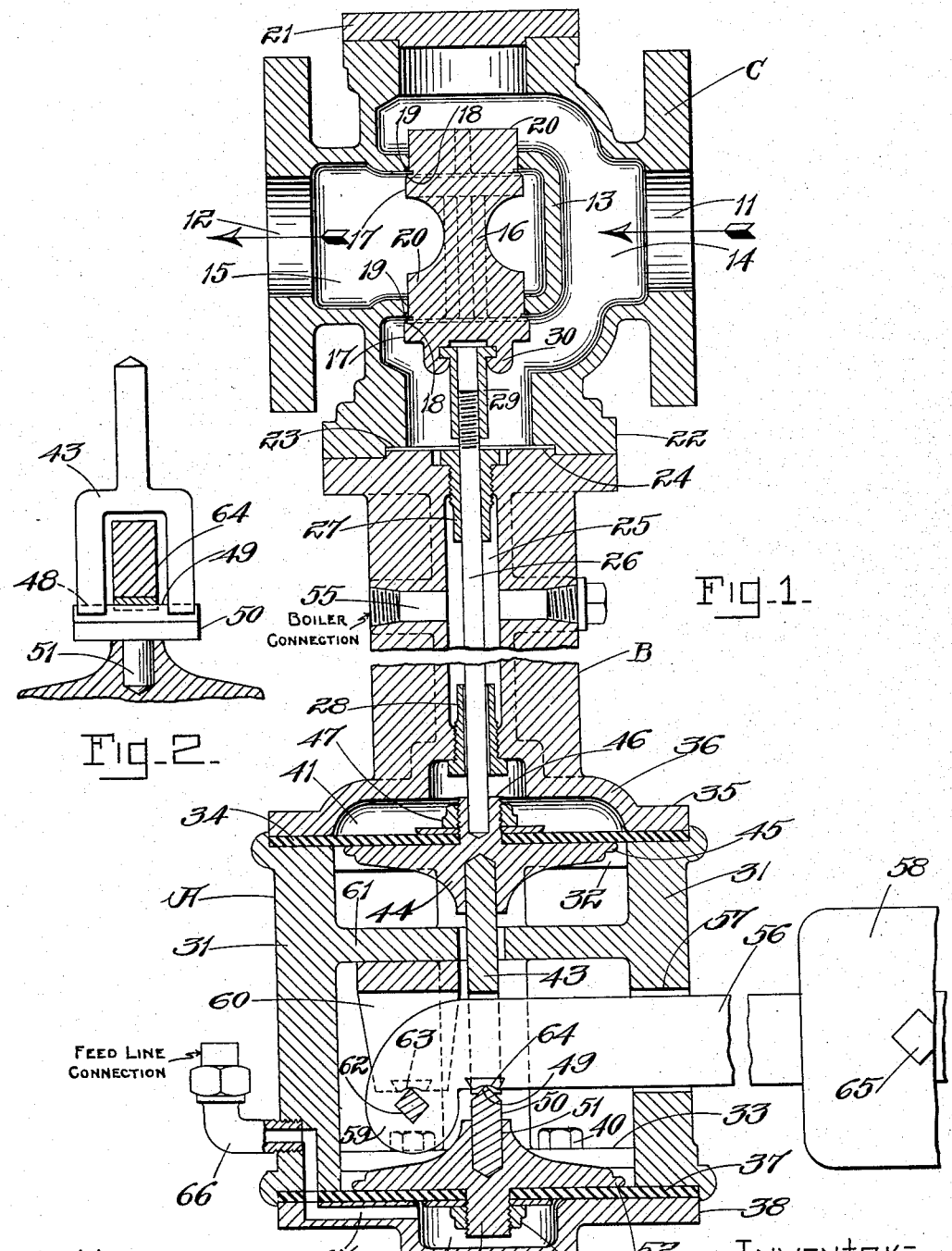

GEORGE S. MELCHER, OF SHARON, MASSACHUSETTS, ASSIGNOR TO CHARLES W. McCONNEL, OF BOSTON, MASSACHUSETTS, ELDON MACLEOD, OF WESTWOOD, MASSACHUSETTS, AND FANNIE B. LOOK, OF NORTHAMPTON, MASSACHUSETTS, TRUSTEES.

FEED-PRESSURE REGULATOR.

1,172,476.          Specification of Letters Patent.        Patented Feb. 22, 1916.

Application filed December 12, 1914. Serial No. 876,970.

*To all whom it may concern:*

Be it known that I, GEORGE S. MELCHER, a citizen of the United States, residing at Sharon, county of Norfolk, State of Massachusetts, have invented a certain new and useful Improvement in Feed-Pressure Regulators, of which the following is a specification, reference being had therein to the accompanying drawings.

My invention has for its object the production of a new and improved type of excess feed pressure regulator which is adapted to be used to maintain a predetermined excess of pressure in the boiler feed line above the initial boiler pressure regardless of variations in the latter.

My device belongs to the type of so-called direct operated regulators in which a diaphragm of rubber or other equally flexible material is employed and is connected directly with the valve. In regulators of the class to which my device belongs the diaphragm is subjected on one side to feed line pressure and on the other side to boiler pressure, the latter acting in combination with an additional pressure which may be varied to maintain the excess pressure desired. Heretofore so far as known to me the additional pressure which coöperates with the initial boiler pressure has been provided by means of a spring. I have found that this arrangement has not been entirely satisfactory for a spring affords an accumulative pressure which causes an undesirable fluctuation in the pressure in the feed line. For example, if the feed line pressure drops below the predetermined amount the spring will expand to cause the valve to open to transmit steam to the pump or other motor which is being employed to maintain pressure in the feed line. This expansion of the spring decreases the force exerted by it so that the feed line pressure will have to drop still lower in order that the initial pressure and the diminished pressure of the spring may overcome the feed line pressure and move the diaphragm enough to transmit the required amount of steam to the pump to increase the pressure in the feed line. In other words the amount of pressure exerted by the spring being entirely dependent upon the amount it is compressed the pressure on the diaphragm is not constant throughout its movement. A proper working of the device demands that the parts should be in balance, and the accumulative pressure afforded by a spring prevents the parts from being in balance except in one position of the diaphragm. When the diaphragm moves from this position the balance is destroyed by an amount dependent entirely upon the movement of the diaphragm. Inasmuch as a flexible diaphragm of rubber or the like is necessarily employed in regulators of this type in order to obtain sufficient valve opening the balance is often destroyed to a marked degree which necessarily results in relatively great and undesirable fluctuations in the feed line pressure. Difficulties are further evidenced in this type of regulators in practical use for it often happens that the volume of feed line pressure is materially increased or decreased as is the case, for example, where additional boilers are being supplied or are taken off of the supply. Where one or more boilers are added it becomes necessary to entirely reset the regulator, for the steam necessary to maintain the required pressure is obviously increased in amount which necessitates a greater valve opening to supply the additional steam required by the feed pressure pump to maintain the feed line pressure. A wider valve opening and a resultant expansion of the spring materially decreases the pressure exerted by the spring which obviously reduces the excess pressure below the amount desired unless the spring is reset to meet the new conditions. On the other hand if the draft on the feed line supply is reduced by the discontinuance of one or more boilers the spring must be reset to prevent the pressure in the feed line from becoming greater than the predetermined amount.

My object is to overcome the difficulties hereinabove described by employing a constant pressure procured by gravity instead of the accumulative pressure afforded by a spring so that the pressure exerted on the diaphragm is always the same regardless of its position.

A further object of my invention is to so construct the device that pressure procured by gravity may be applied to the diaphragm with a minimum of friction for the retarding influence due to friction tends to destroy the necessary balance of the parts. In this manner the required balance is always obtained so that under ordinary circumstances there will be no fluctuation in the feed line pressure. A uniform excess pressure is thus obtained regardless of variations in the initial pressure or in the feed line supply so long as the valve opening afforded by the diaphragm is sufficient to provide the necessary volume of steam required to operate the pump.

My invention will be fully understood from the following description taken in connection with the accompanying drawings and the novel features thereof will be pointed out and clearly defined in the claims at the close of the specification.

In the drawings Figure 1 is a vertical section partly broken away of an excess feed pressure regulator embodying my invention. Fig. 2 is a detail partly in section showing the lever and yoke construction employed between the diaphragms.

Having reference to the drawings there is shown an excess feed pressure regulator consisting of a base A an intermediate member B and a valve body C which are secured together by bolts not shown. The valve body C which may be of any common form and construction is provided with the usual inlet and outlet openings 11 and 12 which are separated by a partition 13 forming chambers 14 and 15. Oppositely disposed holes in the partition 13 which connect the chambers 14 and 15 are controlled by a balanced valve 16. The balanced valve 16 may be of any common form but is preferably provided with disks 17 having beveled portions 18 adapted to coöperate with seats 19 in the partition 13. Winged guides 20 which fit loosely in the holes in the partition 13 serve to insure the proper seating of the valve and at the same time to allow the passage of pressure from the chamber 14 to the chamber 15 when the valve is open. The valve body C is provided at its upper end with a removable head 21 preferably secured by bolts not shown and at its lower end with a flanged portion 22 which is cut away as shown at 23 to receive the counter bore 24 of the intermediate member B.

The intermediate member B has a longitudinal passage 25 therethrough in which a valve stem 26 is located being mounted in guides 27 and 28. The valve stem and valve are connected by means of a T-head member 29 secured to the stem and adapted to be received within a horizontal slot in a projection 30 of the lower valve disk 17. The lower end of the valve stem 26 is arranged to be actuated by a pair of diaphragms in a manner hereinafter to be described.

The base A comprises a plurality of uprights or supports 31 which are preferably four in number being spaced apart as shown and having at each end flanges 32 and 33. A diaphragm 34 is interposed between the flange 32 and a flange 35 on a cup-shaped portion 36 with which the intermediate member B is provided. A diaphragm 37 is interposed between the lower flange 33 and a plate 38 which has a depending portion 39 centrally thereof and which is preferably secured to the flange by bolts 40. The diaphragm 34 together with the cup-shaped member 36 form a chamber 41 and the diaphragm 37 with the depending portion 39 form a chamber 42.

I provide mechanism for transmitting pressure admitted to the chamber 41 above the diaphragm 34 to the diaphragm 37 and pressure admitted to the chamber 42 below the diaphragm 37 to the diaphragm 34 which consists of a yoke 43 the upper end of which is inserted in a hole in the substantially conical-shaped portion 44 of a button 45 bearing against the central portion of the lower surface of the diaphragm 34. The button 45 has a barrel portion 46 which projects upwardly through a hole in the diaphragm and is threaded to receive a nut 47 by which the button is securely clamped to the diaphragm as shown. The bifurcated lower end of the yoke 43 has a shallow groove 48 the rounded apex of which bears on the V-shaped end 49 of a knife edge supporting member 50 having a stem 51 which is adapted to be received within a hole in the substantially conical-shaped portion of the diaphragm button 52. This button is fastened to the diaphragm 37 in a manner similar to the way in which the button 45 is fastened to the diaphragm 34 having a barrel portion 53 projecting through a hole in the center of the diaphragm which is threaded to receive a nut 54 whereby the button may be clamped to the diaphragm.

The diaphragm 34 is subjected to initial or boiler pressure which is admitted to the chamber 41 above the diaphragm by way of a port 55 and passage 25. The guide 28 makes a loose fit with the stem 26 so that while it serves as a guide to the stem the pressure may readily pass around the stem to the chamber 41. The guide 27 on the other hand makes a relatively close fit with the stem 26 so that fluctuations in the pressure in the chamber 14 due to the opening and closing of the valve 16 will not appreciably affect the pressure in the chamber 41. I regard this as important for the pressure in the chamber 41 should be dependent upon the boiler pressure and not on the fluctuating pressure in the chamber 14. Pressure is admitted to the chamber 42 below the diaphragm 37 from the boiler feed line by means of a suitable connection 66 and port 67. A movement of the diaphragms is transmitted to the valve by the stem 26 the lower end of which is threaded into the barrel portion 46 of the button 45 as shown. The yoke 43 and knife edge member 50 being separate from a flexible connection between the diaphragms which eliminates the friction which would arise if a rigid connecting member were employed. I regard this as important for in order to obtain the required balance of the parts the diaphragm must be sensitive to the slightest variation in pressure.

Means for exerting constant pressure additional to the initial boiler pressure for producing the excess pressure desired is provided by a lever 56 which extends through a guide slot 57 and carries a weight 58. The inner end of the lever 56 is preferably rounded or turned down as shown at 59 and projects through the yoke 43 the extreme end being inserted within the bifurcated end of a bracket 60 secured to a horizontal support 61 integral with the uprights 31. The turned down end of the lever is provided at each side with pins 62 which are preferably secured as shown and arranged so that a V-shaped edge rests in a notch 63 in the member 60. That portion of the under side of the lever 56 which lies within the yoke 43 is provided with a transverse groove 64 in which a portion of the V-shaped edge 49 of the knife edge member 50 bears. Inasmuch as the member 60 is fixed the pressure exerted by the weight 58 is brought to bear on the diaphragm 37 through the medium of the lever 56 and the diaphragm button 52. The weight 58 is preferably slotted to receive the lever 56 so that by moving the weight along the lever the resulting pressure on the diaphragm 37 may be varied, a suitable set screw 65 being provided to secure the weight in a given position.

The construction hereinbefore described enables the use of a weight instead of a spring which affords a constant pressure as a medium to balance the predetermined excess of pressure in the feed line. This enables the pressure in the feed line to be maintained at a uniform ratio to the boiler pressure. The use of a pair of diaphragms permits the feed line pressure to be opposed to the initial or boiler pressure and at the same time provides a space open to the atmosphere into which a weight actuated lever may be inserted. By my construction I have eliminated the necessity of introducing a moving part into either of the pressure chambers from the exterior and consequently the use of stuffing boxes with their resulting friction is avoided. Furthermore the knife edge construction employed for transmitting the pressure exerted by the weight to the diaphragm reduces the friction to a minimum and increases the accuracy of regulation obtained. My device therefore affords a constant pressure which coöperates with the initial or boiler pressure without the interposition of any substantial friction so that the balance required to maintain a non-fluctuating feed line pressure is maintained throughout the entire movement of the diaphragm.

What I claim is:

1. In an excess feed pressure regulator the combination with a valve, of a pair of diaphragms operating the valve member of said valve, one of said diaphragms being subjected to one pressure and the other of said diaphragms being subjected to another pressure, and a flexible connection interposed between said diaphragms for transmitting pressure from one to the other whereby one diaphragm may freely move into angular relation with the other diaphragm.

2. An excess feed pressure regulator comprising a valve body provided with a valve member, a pair of diaphragms connected to said valve member, one of which is subjected to initial pressure and the other to feed line pressure, pressure transmitting mechanism interposed between said diaphragms, and means for exerting additional pressure on the diaphragm which is subjected to line pressure, said pressure transmitting mechanism consisting of a pair of members one in engagement with one diaphragm and the other in engagement with the other diaphragm, and of a flexible connection between said members whereby they may move with the diaphragms into angular relation with each other.

3. In an excess feed pressure regulator the combination with a valve having a valve member therein, of a pair of flexible diaphragms connected with said valve member, one of said diaphragms being subjected to one pressure and the other of said diaphragms to another pressure, a pair of buttons one engaging one of said diaphragms and the other engaging the other of said diaphragms, a yoke operatively connected with one of said buttons and a knife edge member engaging the end of said yoke and operatively connected with the other of said buttons thereby forming a flexible connection between said diaphragms whereby said diaphragms may move into angular relation with each other.

4. An excess feed pressure regulator comprising a body having inlet and outlet openings, a valve controlling the passage of pressure through said openings, a pair of diaphragms connected with said valve, said diaphragms having a space between them open to the atmosphere and one being subjected to initial pressure and the other to feed line pressure, a yoke bearing against one of said diaphragms, a knife edge member bearing against the other of said diaphragms having a knife edge portion contacting with the bifurcated end of said yoke, a lever projecting into the space between said diaphragms and through the bifurcated end of said yoke and resting on said knife edge member, a fixed member about which said lever moves as a pivot and a weight secured to said lever.

5. An excess feed pressure regulator having inlet and outlet openings, a valve controlling the passage of pressure through said openings, a pair of diaphragms connected with said valve and being subjected one to initial pressure and the other to feed line pressure, said diaphragms having a space between them open to the atmosphere, pressure transmitting mechanism interposed between said diaphragms comprising a yoke connected with one of said diaphragms and a knife edge member connected with the other of said diaphragms, the bifurcated end of said yoke having a shallow groove which rests on the V-shaped end of said knife edge member, a lever projecting into the space between said diaphragms and within the bifurcated portion of said yoke, said lever having a shallow groove the rounded apex of which rests on the V-shaped end of said knife edge member, a fixed member about which said lever moves as a pivot and a weight secured to said lever and operating to bring pressure to bear on the diaphragm which is subjected to initial pressure.

6. An excess feed pressure regulator comprising a body having inlet and outlet openings, a valve in said body controlling the passage of pressure through said openings, a diaphragm in said body subjected to initial pressure on one side and to feed line pressure on the other side, a stem connecting said valve with said diaphragm, an intermediate member inclosing said stem and having a passage therethrough through which said stem projects, a pair of guides located within said passage one of which makes a tight sliding fit with said stem and the other of which makes a loose sliding fit therewith, said body having a port admitting initial pressure to said passage between said guides, said pressure being permitted to pass to said diaphragm by way of said loose fitting guide, and a weighted lever exerting pressure on said diaphragm opposed to the feed line pressure.

7. An excess feed pressure regulator comprising a body having inlet and outlet openings therein, a valve controlling the passage of pressure through said openings, a diaphragm subjected on one side to initial pressure and on the other side to feed line pressure, said body having a chamber one wall of which is formed by said diaphragm and having a passage connecting said diaphragm chamber with said inlet opening, a stem extending through said passage and connecting said valve with said diaphragm, a pair of guides located within said passage one of which makes a tight sliding fit with said stem and the other of which makes a loose sliding fit therewith, said body having a port admitting initial pressure to said passage between said guides, and a weighted lever exerting pressure on said diaphragm which is opposed to the feed line pressure.

In testimony whereof I affix my signature, in presence of two witnesses.

GEORGE S. MELCHER.

Witnesses:
CAMERON MACLEOD,
ALICE H. MORRISON.

Copies of this patent may be obtained for five cents each, by addressing the "Commissioner of Patents, Washington, D. C."